United States Patent
Liu et al.

(10) Patent No.: US 7,490,234 B2
(45) Date of Patent: *Feb. 10, 2009

(54) METHODS AND APPARATUS FOR AUTOMATIC SYSTEM PARAMETER CONFIGURATION FOR PERFORMANCE IMPROVEMENT

(75) Inventors: Zhen Liu, Tarrytown, NY (US); Mukund Raghavachari, Baldwin Place, NY (US); Bowei Xi, Beijing (CN); Cathy Honghui Xia, Croton-on-Hudson, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/833,345

(22) Filed: Aug. 3, 2007

(65) Prior Publication Data
US 2007/0271368 A1 Nov. 22, 2007

Related U.S. Application Data

(63) Continuation of application No. 10/849,357, filed on May 19, 2004, now Pat. No. 7,272,707.

(51) Int. Cl.
*G06F 15/177* (2006.01)
*G06F 7/08* (2006.01)
(52) U.S. Cl. ............... 713/1; 713/100; 707/3; 706/19
(58) Field of Classification Search .......... 713/1, 713/2, 100; 706/13, 19; 707/3
See application file for complete search history.

(56) References Cited

U.S. PATENT DOCUMENTS

| | | | |
|---|---|---|---|
| 6,336,050 B1 * | 1/2002 | Amin et al. | 700/28 |
| 2002/0183987 A1 * | 12/2002 | Chiang | 703/2 |
| 2004/0030782 A1 * | 2/2004 | Nakahara | 709/226 |
| 2004/0249480 A1 * | 12/2004 | Lefebvre et al. | 700/31 |
| 2004/0267679 A1 | 12/2004 | Fromherz et al. | |
| 2005/0010922 A1 | 1/2005 | Czajkowski et al. | |
| 2005/0203879 A1 | 9/2005 | Doris | |
| 2006/0047353 A1 * | 3/2006 | Maenishi et al. | 700/100 |
| 2007/0208677 A1 * | 9/2007 | Goldberg et al. | 706/13 |

OTHER PUBLICATIONS

Boyan, et al., "Learning Evaluation Functions for Global Optimization and Boolean Satisfiability," J. Machine Learning Res., 1:77-112, 1998.
Diao, et al., "Using MIMO Feedback Control to Enforce Policies for Interrelated Metrics with Application to the Apache Web Server," Proc. Network Operations and Management Symposium, 2002.

(Continued)

*Primary Examiner*—Nitin C Patel
*Assistant Examiner*—Fahmida Rahman

(57) ABSTRACT

In one embodiment, the present invention is a method and apparatus for automatic system parameter configuration for performance improvement. One embodiment of the inventive method involves formulating a black box optimization problem, and solving the optimization problem using an enhanced smart hill climbing method. The smart hill climbing method includes both a global and a more precise local search to identify an optimal solution. In one embodiment, one or both of the global and local searches employs a weighted Latin Hypercube Sampling method in combination with importance sampling techniques to yield improved search results.

15 Claims, 6 Drawing Sheets

OTHER PUBLICATIONS

Kirkpatrick, et al., "Optimization by Simulated Annealing," Science, 220(4598), May 13, 1983, 671-680.

Liu, et al., "Online Response Time Optimization of Apache Web Server," IWQoS 2003: 461-478.

McKay, et al., "A Comparison of Three Methods for Selecting Values of Input Variables in the Analysis of Output from a Computer Code," Technometrics, 21(2), May 1979, 239-245.

Raghavachari, et al., "The Deployer's Problem: Configuring Application Servers for Performance and Reliability," ICSE 2003, Portland, OR.

Romeijn, et al., "Simulated Annealing and Adaptive Search in Global Optimization," Probability in the Engineering and Informational Sciences, 8, 1994, 571-590.

Sha, et al., "Queueing Model Based Network Server Performance Control," Proc. 23rd IEEE Real-Time Systems Symposium, 2002, 81-90.

Ye, et al., "A Recursive Random Search Algorithm for Large-Scale Network Parameter Configuration," SIGMETRICS'03, Jun. 10-14, 2003, San Diego, CA, 196-205.

Zabinsky, et al., "Improving Hit-and-Run for Global Optimization," J. Global Optimization, 3:171-192, 1993.

\* cited by examiner

METHODS AND APPARATUS FOR AUTOMATIC SYSTEM PARAMETER CONFIGURATION FOR PERFORMANCE IMPROVEMENT

CROSS REFERENCE TO RELATED APPLICATIONS

This application is a continuation of U.S. patent application Ser. No. 10/849,357, filed May 19, 2004 now U.S. Pat. No. 7,272,707, which is herein incorporated by reference in its entirety.

BACKGROUND

The present invention relates generally to computer hardware, and relates more particularly to the configuration of computing systems, for example, servers. Specifically, the present invention provides methods and an apparatus for automatic system parameter configuration for performance improvement.

The overwhelming success of the World Wide Web as a mechanism for facilitating information retrieval and conducting business transactions has led to an increase in the deployment of complex enterprise applications. These applications typically run on web application servers, which manage tasks including concurrency, memory management, database access and the like. The performance of an application server depends heavily on appropriate configuration, which is a difficult and error-prone task due to a large number of configuration parameters (which may number more than one hundred) and complex interactions between these parameters.

FIG. 1 is a schematic diagram illustrating a typical Java 2 Enterprise Edition (J2EE) based application server system 100. The system 100 includes a web server 102, an application server 104 and a database 106. Typically, HTTP and web service requests flow through the web server 102 to the application server 104, which further comprises a web container 108, an Enterprise Java Bean (EJB) container 110 and a data source 112. Within the application server, requests typically flow from the web container 108 to the EJB container 110 to the data source 112 to the database 106. Each component 108, 110 and 112 of the application server has configurable parameters that can significantly impact system performance.

Despite the importance of configuration, the setting of parameters is an imprecise practice. For example, developers typically use rules-of-thumb, heuristics, or best practice guidelines provided by software vendors to derive the settings. However, configuration depends largely on the particular application being deployed and its expected workload, as well as the configuration of the systems with which it interacts.

Thus, there is a need in the art for a method and apparatus for automatic system parameter configuration for performance improvement.

SUMMARY OF THE INVENTION

In one embodiment, the present invention is a method and apparatus for automatic system parameter configuration for performance improvement. One embodiment of the inventive method involves formulating a black box optimization problem, and solving the optimization problem using an enhanced smart hill climbing method. The smart hill climbing method includes both a global and a more precise local search to identify an optimal solution. In one embodiment, one or both of the global and local searches employs a weighted Latin Hypercube Sampling method in combination with importance sampling techniques to yield improved search results.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for automatic system parameter configuration for performance improvement. Although the invention will be described within the exemplary context of the configuration of an application server, those skilled in the art will appreciate that the present invention may be deployed to configure the system parameters of any computing system, and not just the parameters of an application server. The method of the present invention provides an efficient, automatic system for determining the optimal values of key system parameters. In turn, the implementation of the optimal parameter settings will improve system performance by minimizing system response time and maximizing system throughput.

Figure 1:
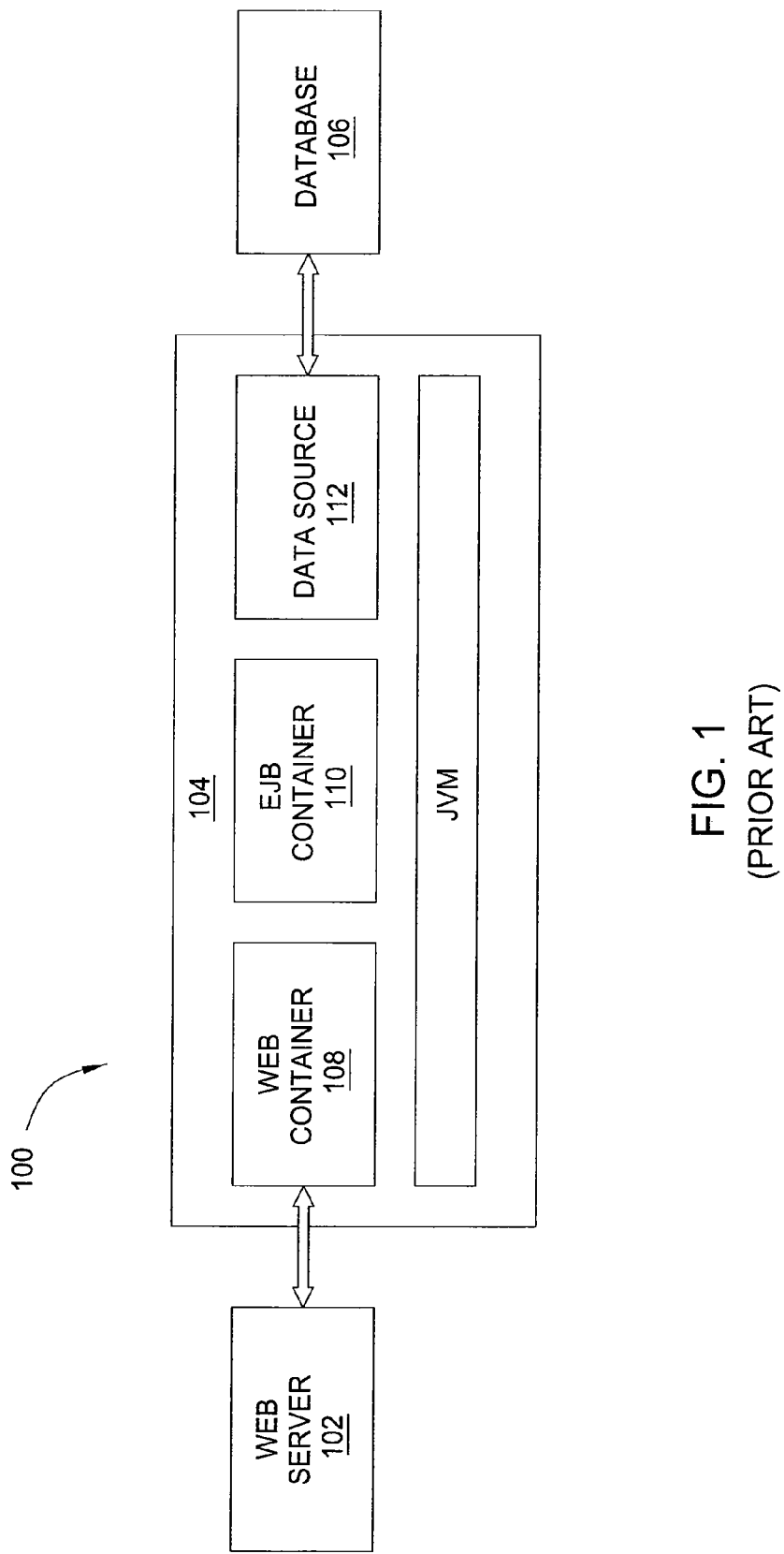
FIG. 1 is a schematic diagram illustrating a typical Java 2 Enterprise Edition (J2EE) based application server system.
Figure 2:
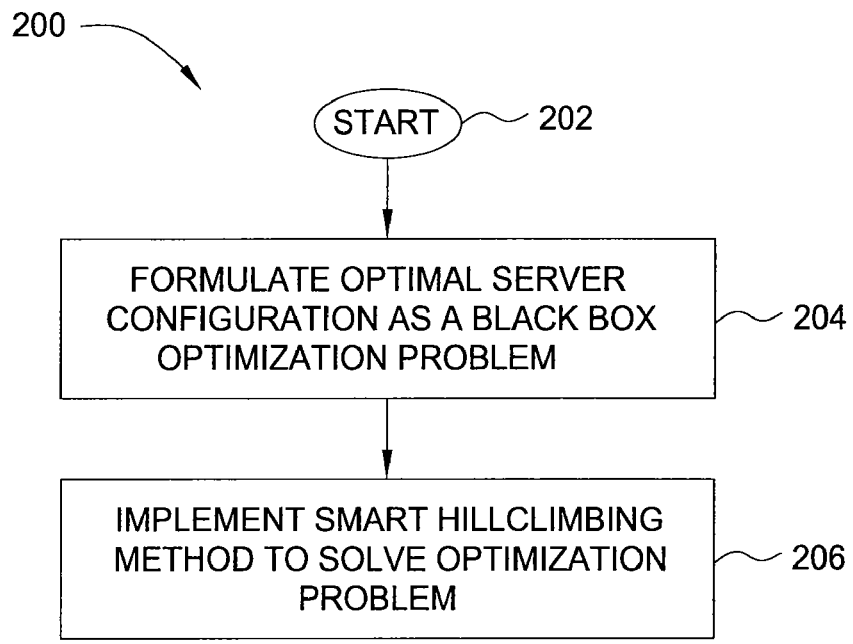
FIG. 2 is a flow diagram illustrating a method for system parameter configuration, according to one embodiment of the present invention.

FIG. 2 is a flow diagram illustrating a method 200 for computing system configuration, according to one embodiment of the present invention. Method 200 is initialized at step 202 and proceeds to step 204, where the method 200 formulates the optimal configuration of a computing system, e.g., an application server, as a black box optimization problem. In one embodiment, the method 200 considers server performance as a function, g, of a given number of tunable parameters $x_1, \ldots, x_N$, other fixed environment settings and a load condition on the server. The tunable parameters $x_1, \ldots, x_N$ may include server throughput, response time, utilization and the like. The parameter setting $\overline{X}$ that achieves the best server performance may thus be calculated as:

$$\overline{X} = \underset{x \in I}{\mathrm{argmin}}\, g(x) \tag{EQN. 1}$$

wherein $x=(x_1, \ldots, x_N)$, $I_i$ is the parameter range for parameter $x_i$ and $I=I_i \times \ldots \times I_N$, where I is a compact set in $\mathrm{IR}^N$.

In one embodiment, the performance function g(x) is unknown or does not have a closed form. Thus, in step 204, the method 200 formulates the black box optimization problem as a problem where the objective function is black-box with limited function evaluation. The challenge is for the method 200 to obtain a global optimal solution.

When I is large, finding $\overline{X}$ is generally difficult. In addition, function evaluation for each individual parameter setting x requires effort in setting up experiments and data collection, which can be time consuming and expensive. Thus, efficiency, i.e., the generation of a good solution with a minimum number of experiments, is of paramount importance in choosing a search method to solve the problem formulated in step 204.

Thus, in step 206, the method 200 implements a "smart hill climbing" method to solve the optimization problem formulated in step 204. As described in further detail with reference to FIG. 3, the smart hill climbing method comprises two main steps: a global searching step and a local searching step.

Figure 3:
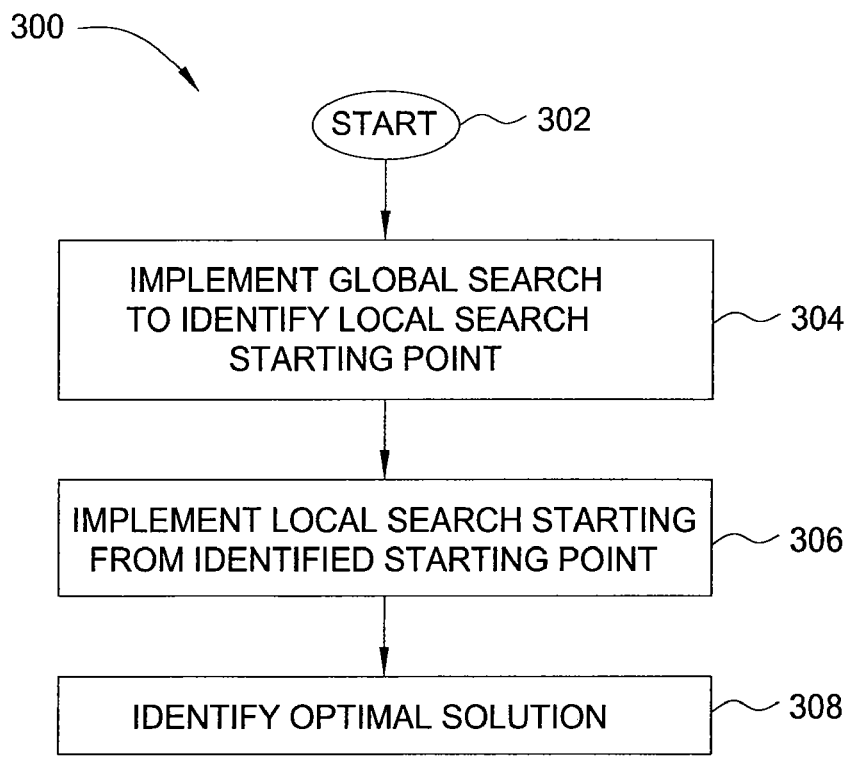
FIG. 3 is a flow diagram illustrating a smart hill climbing method for solving the optimization problem formulated by the method illustrated in FIG. 2, according to one embodiment of the present invention.

FIG. 3 is a flow diagram illustrating a smart hill climbing method 300 for solving the optimization problem formulated by the method 200, according to one embodiment of the present invention. The method 300 is initialized at step 302 and proceeds to step 304, where the method 300 implements a global searching step that provides enough coverage to identify a good starting point for a more precise local searching step. The starting point represents one possible solution to the optimization problem. In one embodiment, the method 300 executes step 304 by employing Latin Hybercube Sampling (LHS), as described in further detail with reference to FIGS. 4 and 5, to provide high-quality sampling coverage. In further embodiments, the LHS method is extended to apply importance sampling, as described in further detail below in conjunction with FIG. 9, which takes advantage of correlation factors so that the global search method samples more frequently from a region that is likely to contain an optimal solution.

Once the method 300 has identified the appropriate starting point, the method 300 proceeds to step 306 and implements a local search starting from the starting point identified in step 304 and applying a gradient-based sampling method to search around the neighborhood of the starting point for a better solution to the optimization problem. Thus, the size of the neighborhood decreases as the local searching step 306 progresses. In one embodiment, the gradient-based sampling method is applied based on the construction of locally fitted quadratic functions, leading to better convergence for the location of optimal solutions. As the method 300 applies the gradient-based sampling method, the method 300 progresses toward step 308, where the method 300 identifies an optimal solution to the optimization problem.

Figure 4:
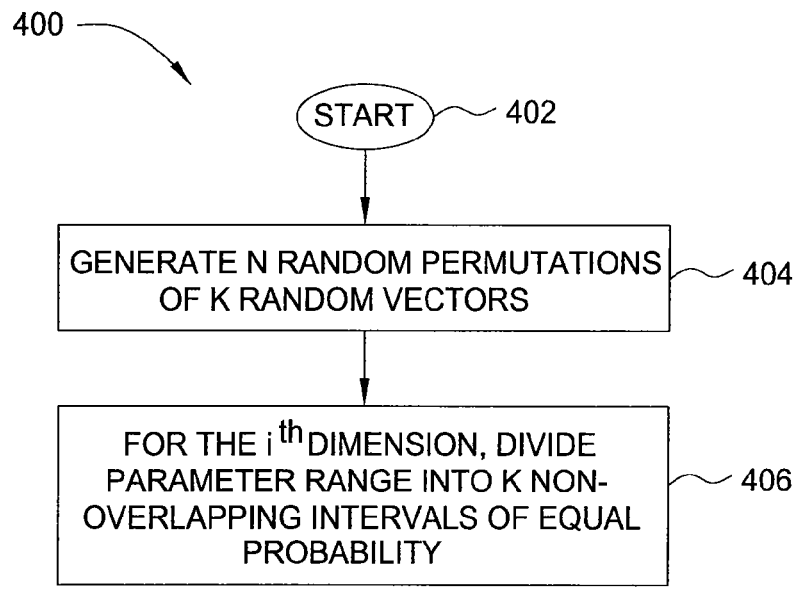
FIG. 4 is a flow diagram illustrating one embodiment of a Latin Hypercube Sampling method for use in the global searching step of the method illustrating in FIG. 3.

FIG. 4 is a flow diagram illustrating one embodiment of an LHS method 400 for use in the global searching step 304 of the method 300. A basic goal of the method 400 is to divide a set of probability distributions into ranges of equal probabilities, and take one sample from each equi-probability interval. Thus, the method 400 is initialized at step 402 and proceeds to step 404, where, for a dimension N, the method 400 generates N random permutations of K random vectors (or configurations) of dimension N. In one embodiment, the permutations are denoted by $\overline{P}^1, \ldots, \overline{P}^N$, where $\overline{P}^i=(P_1^i, \ldots, P_K^i)$.

The method 400 then proceeds to step 406 and, for the $i^{th}$ dimension (where $i=1, \ldots, N$), divides the parameter range $I_i$ into K non-overlapping intervals of equal probabilities, e.g., 1/K. The $k^{th}$ sample point will thus be an N-dimensional vector, with the value for the dimension i uniformly drawn from the $P_k^i$-th interval of $I_i$.

Figure 5:
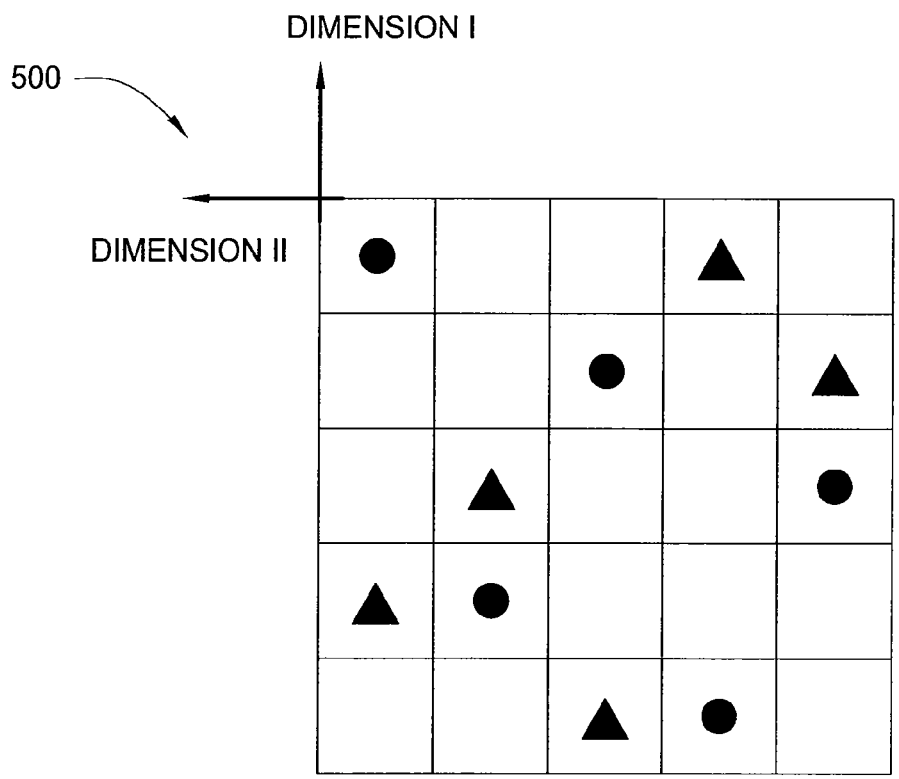
FIG. 5 is a schematic diagram illustrating two sets of Latin Hypercube Sampling samples obtained according to the method illustrated in FIG. 4.

FIG. 5 is a schematic diagram 500 illustrating two sets of LHS samples obtained according to the method 400. A first set of samples is denoted by dots, and a second set of samples is denoted by triangles. Both the first and the second sets include five randomly generated samples of dimension two. A set of LHS samples with K vectors will have exactly one point in every interval on each dimension. That is, LHS according to the present invention attempts to provide coverage of an experimental space as evenly as possible. Thus, LHS according to the present invention provides a better coverage of the parameter space than alternative sampling methods, and also allows a significant reduction in the sample size to achieve a given level of confidence without compromising the overall quality of the analysis. Therefore, in one embodiment, an LHS method according to FIGS. 4 and 5 is used in the smart hill climbing method 300 of FIG. 3 every time there is a need for random sampling.

Figure 6:
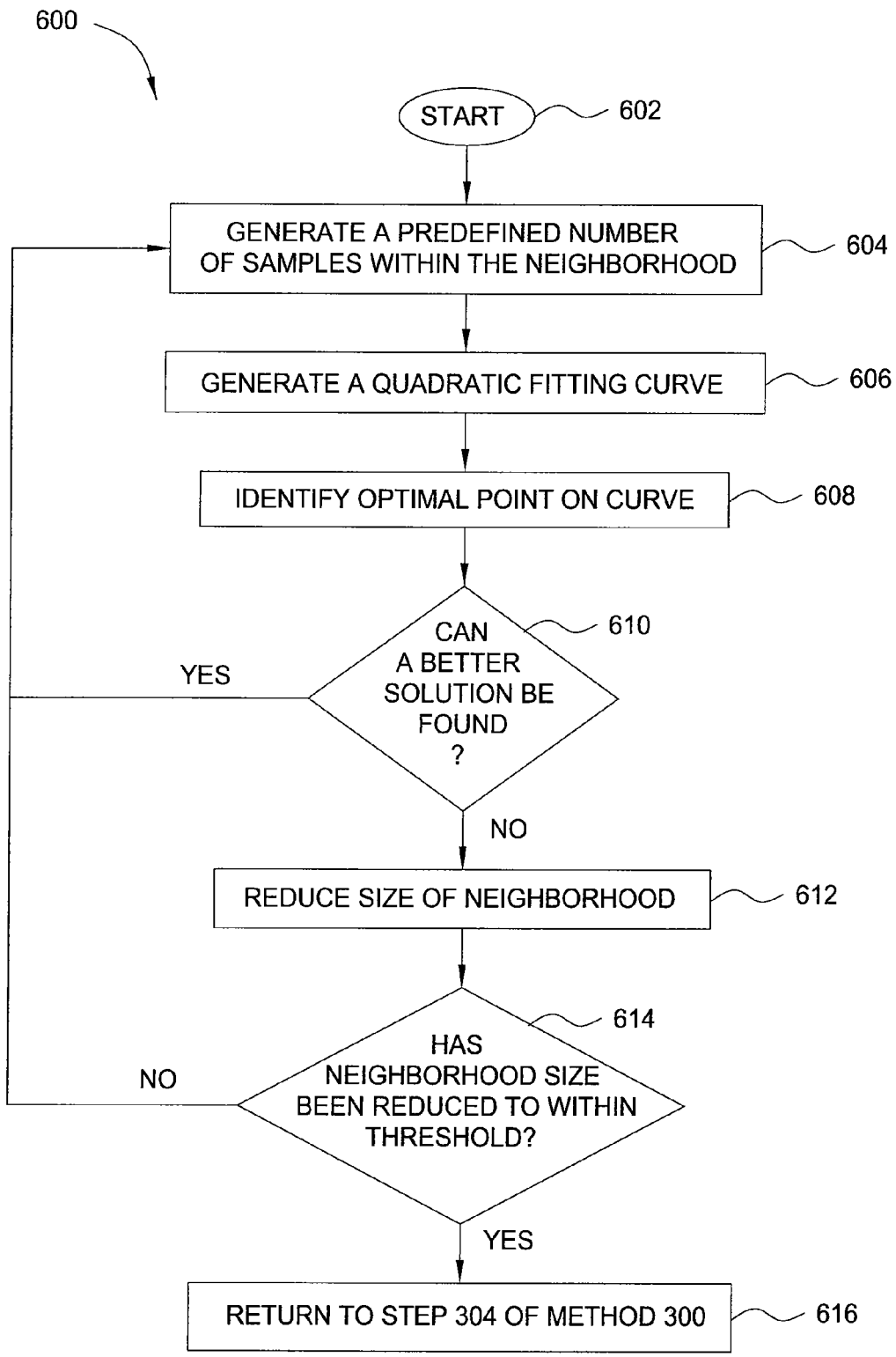
FIG. 6 is a flow diagram illustrating an improved hill climbing method that may be implemented for both the global and local searching steps illustrated in FIG. 3, according to one embodiment of the present invention.

FIG. 6 is a flow diagram illustrating an improved hill climbing method 600 that may be implemented for both the global and local searching steps 304, 306 of the smart hill climbing method 300, according to one embodiment of the present invention. The method 600 is initialized at step 602 and proceeds to step 604, where the method 600 generates a predefined number of samples within a neighborhood. The neighborhood may be established by identifying a point yielding the best performance, and setting the point to be the center of the neighborhood for the local search. In one embodiment, the samples are generated using an LHS method as described with reference to FIGS. 4 and 5. In one embodiment, the LHS method is a weighted LHS method, as described with reference to FIG. 8. After generating the predefined number of samples, the method 600 proceeds to step 606 and constructs, for each dimension, a quadratic fitting curve based on the existing local samples.

The method 600 then proceeds to step 608 and identifies the optimal (e.g., minimal) point on the quadratic curve. The minimal points for all dimensions are combined to form a next candidate for the best solution, e.g., $\overline{X}$. In step 610, the method 600 inquires if a better solution than the next candidate point identified in step 608 can be found. If a better solution can be found, the method 600 returns to step 604 and repeats the fitting procedure until no better solution can be found. Alternatively, if the method 600 determines at step 610 that no better solution can be found, the method 600 reduces the size of the sampling neighborhood in step 612. In one embodiment, a predefined shrink factor dictates the amount by which the sampling neighborhood is shrunk.

After reducing the size of the sampling neighborhood, the method 600 inquires in step 614 if the sampling neighborhood has been reduced within a predefined threshold. If the sampling neighborhood has not been reduced to within the predefined threshold, the method 600 returns to step 604 and attempts to further reduce the neighborhood size by repeating steps 604-612. Alternatively, if the method 600 concludes that the neighborhood size has been reduced to within the predefined threshold, the method 600 identifies a "solution" in step 616. The identified "solution" may be a local search starting point, if the method 600 is employed in a global search (e.g., step 304 of FIG. 3) or an optimal solution to the black box problem if the method 600 is employed in a local search (e.g., step 306 of FIG. 3). In an alternative embodiment, the "solution" may be identified when a predefined number of samples has been generated.

Thus, the improved search method 600 takes into account knowledge learned about the correlation structures during a local searching step, the basic idea being that server performance is often correlated with certain parameters. The correlation corresponds to a linear approximation of the objective function, and can be roughly estimated through the sampled points. From the global search perspective, the correlation information can be combined with LHS to generate skewed random search samples. From the local search perspective, as described above, quadratic approximations may be employed to guide the search procedure to an optimal solution. In this way, the searching procedure takes advantage of sampled points and uses information from the sampled points to further guide the search procedure. In one embodiment, the smart hill climbing method 300 also draws random samples at the beginning and restarting phases. Further local sampling is performed from selected candidate points.

In one embodiment, key functions of the smart hill climbing method 300 include regression fitting of linear and quadratic functions (e.g., step 606 of method 600), finding minimal points of quadratic functions within given intervals (e.g., step 608 of method 600) and weighted LHS. One embodiment of a weighted LHS method incorporates the correlation between the server parameters x and the performance function g(x) to generate intervals for each dimension and to sample points from a given range.

In one embodiment, analysis of the correlation structure assumes that S experiments have been carried out (where S increases as the method 300 proceeds), where $x^S = (x^S_1, \ldots, x^S_N)$ is a vector of parameter setting at experiment s and s= 1, ..., S, and where $y^s$ s is a corresponding function value of the black box objective function (e.g., as formulated in step 204 of the method 200). For example, $y^s$ s could be client response time. Thus, for an unknown function g:

$$y^s = g(x^s), s=1, \ldots, S \quad \text{(EQN. 2)}$$

The correlation structure may be analyzed based on the measurements described above. For example, the correlation between server performance and an individual tunable parameter i may be analyzed by linear regression, where estimates are obtained for $a_i$ and $b_i$ (i=1, ..., N) based on the past S measurements, where:

$$Y = a_i X_i + b_i \quad \text{(EQN. 3)}$$

wherein $Y = (y^1, \ldots, y^s)$, $X_i$ collects all used values for parameter I in the past S experiments and $X_i = (x_i^1, \ldots, x_i^S)$, $a_i = p_i \, std(Y)/std(X_i)$, and $p_i$ is the correlation coefficient between the server performance and the parameter i.

One key feature of the smart hill climbing method 600 described with reference to FIG. 6 is that new samples follow the correlation pattern exhibited by past measured points. This may be referred to as "importance sampling". For example, if past measurements show that smaller values of parameter i tend to indicate better server performance (e.g., a strong positive correlation), then smaller values are assumed to be more "important" (e.g., more likely to be closer to an optimal solution) than larger ones. Thus, in one embodiment, the method 600 samples more on the smaller values for the parameter I.

In one embodiment, importance sampling is implemented by the method 600 using a truncated exponential density function for generating samples. Since the idea is same in the sampling of all parameters, the truncated exponential density function may be expressed, without the subscript i, as:

$$f(c, g, x) = g e^{-acx} \quad \text{(EQN. 4)}$$

wherein the sampling range is $x \in [m, M]$. For $f(c, g, x)$ to be a density function, the normalizing factor g is:

$$g = \frac{ac}{e^{-acm} - e^{-acM}} \quad \text{(EQN. 5)}$$

In one embodiment, the interval [m, M] is divided into K intervals with equal probability 1/K. Letting $z_j$ be the $j^{th}$ dividing point:

$$j/K = \int_m^{z_j} f(c, g, x) dx \quad \text{(EQN. 6)}$$

The solution for $z_j$ is thus:

$$z_j = -\frac{\log\left(e^{-acm} - \frac{acj}{gK}\right)}{ac} \quad \text{(EQN. 7)}$$

In one embodiment, $z_j$ denotes the dividing points for a parameter range, e.g., for use in step 406 of the method 400, or for use in weighted LHS as described in further detail below with reference to FIG. 8.

One point $\xi_j$ is drawn from a given interval $[z_j, z_{j+1}]$, which follows a conditional probability $f(c, g, x)/h$, where h is a scaling constant. Thus, solving for h from the normalizing equation (e.g., EQN. 6):

$$1 = \int_{z_j}^{z_{j+1}} \frac{f(c, g, x)}{h} dx \quad \text{(EQN. 8)}$$

Therefore, the expression for h is:

$$h = \frac{g(e^{-acz_j} - e^{-acz_{j+1}})}{ac} \quad \text{(EQN. 9)}$$

A random number, u, is drawn from a uniform distribution in an interval [0, 1]. The point $\xi_j$ is drawn such that:

$$u = \int_{z_j}^{\xi_j} \frac{f(c, g, x)}{h} dx \quad \text{(EQN. 10)}$$

After standard algebraic manipulations, the expression for $\xi_j$ becomes:

$$\xi_j = -\frac{\log(e^{-acz_j} - u(e^{-acz_j} - e^{-acz_{j+1}}))}{ac} \quad \text{(EQN. 11)}$$

Figure 7:
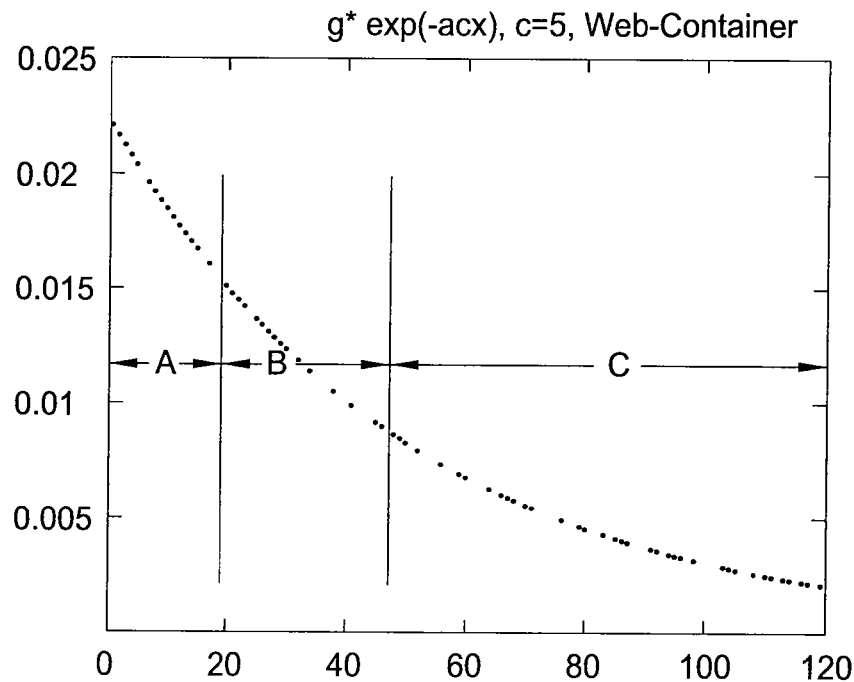
FIG. 7 is a graph illustrating importance sampling using a correlation structure, according to one embodiment of the present invention.

FIG. 7 is a graph illustrating importance sampling using a correlation structure, according to one embodiment of the present invention. FIG. 7 is based on an illustrative parameter with a positive correlation of $\rho \sim 0.6$, wherein the importance sampling method using the truncated exponential density function (e.g., EQN. 4) divides the sampling space [1, 120] into three equi-probability intervals A, B and C. In this embodiment, smaller values are stressed more under importance sampling than larger values. Thus, in one embodiment, setting a value of 5 for c in EQN. 4 for all parameters yields satisfactory results.

Figure 8:
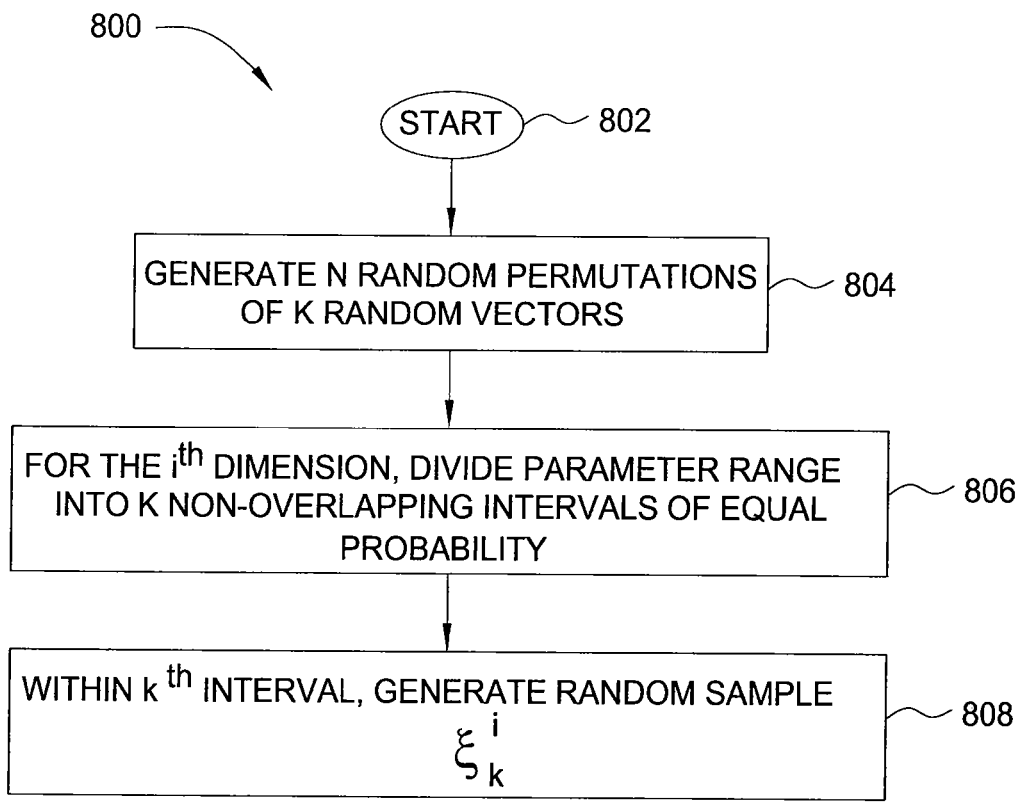
FIG. 8 is a flow diagram illustrating a weighted method for Latin Hypercube Sampling, according to one embodiment of the present invention.

Thus, FIG. 8 is a flow diagram illustrating a weighted method 800 for LHS, according to one embodiment of the present invention. The method 800 is substantially similar to the LHS method 400, but is weighted according to the concepts described above. Thus, the method 800 is initialized at step 802 and proceeds to step 804, where, for a dimension N, the method 800 generates N random permutations of K random vectors (or configurations) of dimension N. In one embodiment, the permutations are denoted by $P^1, \ldots, P^N$, where $P^i = (P_1^i, \ldots, P_K^i)$.

The method 800 then proceeds to step 806 and, for the $i^{th}$ dimension (where $i=1, \ldots, N$), divides the parameter range $I_i$ into K non-overlapping intervals of equal probabilities, e.g., 1/K. In one embodiment, the dividing points are calculated according to EQN. 7, as described above. The method 800 then proceeds to step 808, and for the $k^{th}$ interval (for the $i^{th}$ dimension), generates a random sample $\xi_k^i$. In one embodiment, $\xi_k^i$ is generated using EQN. 11, as described above. The $j^{th}$ sample point will thus be an N-dimensional vector, with the value for the dimension i equal to $\xi_{P_j^i}^i$, $i=1, \ldots, N$.

The present invention thus provides a reliable and efficient means for configuring computing systems, such as application servers. The present invention takes advantage of global trend and correlation information when generating samples from a global level, which optimizes performance for servers whose performance depends on certain parameters in a rough monotonic fashion on a global level. Moreover, by estimating local gradient properties, these estimated properties can be employed to guide local searching steps. Thus, the inventive method is enabled to quickly find high-quality solutions for server parameter optimization.

Figure 9:
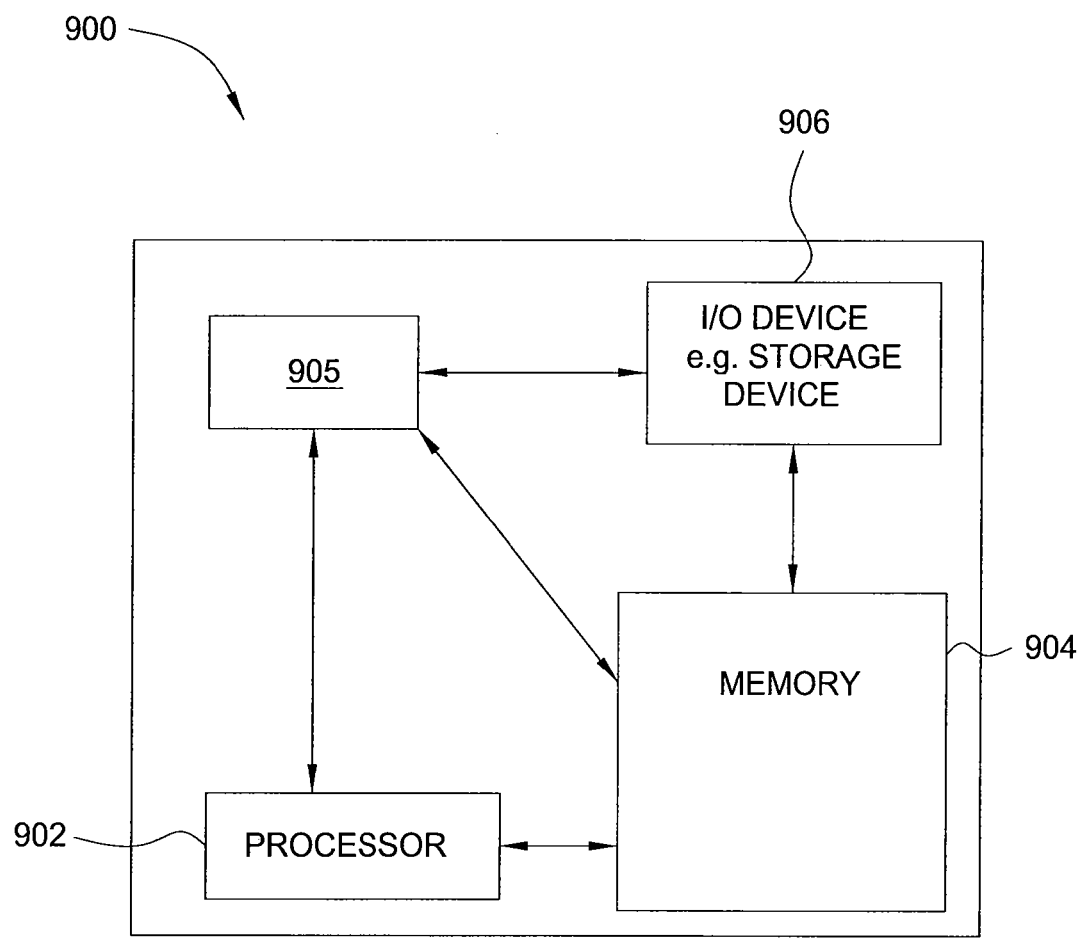
FIG. 9 is a high level block diagram of a system parameter configuration method according to on embodiment of the present invention that is implemented using a general purpose computing device.

FIG. 9 is a high level block diagram of the server configuration method that is implemented using a general purpose computing device 900. In one embodiment, a general purpose computing device 900 comprises a processor 902, a memory 904, a server configuration module 905 and various input/output (I/O) devices 906 such as a display, a keyboard, a mouse, a modem, and the like. In one embodiment, at least one I/O device is a storage device (e.g., a disk drive, an optical disk drive, a floppy disk drive). It should be understood that the server configuration module 905 can be implemented as a physical device or subsystem that is coupled to a processor through a communication channel.

Alternatively, the server configuration module 905 can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the server configuration module 905 for allocating resources among entities described herein with reference to the preceding Figures can be stored on a computer readable medium or carrier (e.g., RAM, magnetic or optical drive or diskette, and the like).

Thus, the present invention represents a significant advancement in the field of system parameter configuration (e.g., the configuration of application servers). A method including novel smart hill climbing and weighted LHS techniques is provided that exploits knowledge of past experiments in order to enable a system to be optimally configured in a manner that is quicker and more precise than existing configuration methods using uniform sampling techniques.

While foregoing is directed to the preferred embodiment of the present invention, other and further embodiments of the invention may be devised without departing from the basic scope thereof, and the scope thereof is determined by the claims that follow.

The invention claimed is:

1. A method for configuring a computing system having a plurality of tunable parameters, the method comprising the steps of:

formulating a performance of the computing system as a function of at least two of the plurality of tunable parameters;

identifying an optimal selling for the computing system as a selling that maximizes the function, using a smart hill climbing method, where the optimal setting yields a set of values for the at least two of the plurality of tunable parameters; and outputting the optimal setting for configuration of the computing system, wherein the smart hill climbing method comprises:

performing a global search guided by a correlation between the performance of the computing system and the at least two of the plurality of tunable parameters; and performing a local search on an initial candidate point identified by said global search, wherein the initial candidate point represents a first possible set of values for the at least two of the plurality of tunable parameters, and wherein at least one of the global and local searching steps comprises the steps of:

establishing a local search neighborhood around the initial candidate point;

generating a plurality of samples from within the local search neighborhood;

updating information regarding the performance of the computing system, based on the plurality of samples generated; and processing the plurality of samples to generate a second candidate point, the second candidate point representing a second possible set of values for the at least two of the plurality of tunable parameters, wherein the step of processing the plurality of samples further comprises the steps of:

constructing at least one quadratic fitting curve based on the generated samples, wherein each of the at least one quadratic fitting curve is constructed for each dimension;

identifying a minimal point according to each of the at least one quadratic fitting curve; and combining the minimal points for all dimensions to generate the second candidate point.

2. The method of claim 1, further comprising the steps of:

constructing a new quadratic fitting curve including the second candidate point, if the second possible set of values will not yield a better computing system performance than the first possible set of values; and generating a subsequent candidate point based on the new quadratic fitting curve.

3. The method of claim 2, further comprising the steps of modifying the local search neighborhood so that the subsequent candidate point is at a center of the local search neighborhood, if a subsequent set of possible values represented by the subsequent candidate point will yield a better computing system performance than the first possible set of values;

generating a subsequent sample; and updating information regarding the performance of the computing system, based on the subsequent sample.

4. The method of claim 3, further comprising the step of:

shrinking a size of the local search neighborhood, if the subsequent set of possible values will not yield the better computing system performance than the first possible set of values.

5. The method of claim 4, further comprising the steps of:

generating a new sample from the local search neighborhood, if the size of the local search neighborhood has not shrunk beyond a predefined threshold; and updating information regarding the performance of the computing system, based on the new sample.

6. The method of claim 1, further comprising the step of:

applying said optimal setting to configure an application server.

7. The method of claim 1, wherein the performing said local search searches in a neighborhood of the initial candidate point for the second possible set of values that will yield better computing system performance than the first possible set of values.

8. The method of claim 7, wherein the local searching step applies a gradient-based sampling method to search the neighborhood.

9. The method of claim 7, wherein at least one of the global and local searching steps comprises a Latin Hypercube Sampling method.

10. The method of claim 9, wherein the Latin Hypercube Sampling method is weighted.

11. The method of claim 10, wherein the weighted Latin Hypercube Sampling method is for generating a plurality of random sets of values of a specified dimension for the at feast two of the plurality of tunable parameters.

12. The method of claim 11, wherein the weighted Latin Hypercube Sampling method comprises the steps of:

generating a plurality of permutations of the random sets of values, wherein a number of said permutations corresponds to a number of said dimensions;

dividing a parameter range of each of the dimensions into a plurality of non-overlapping intervals with equal probabilities, wherein a number of intervals corresponds to a number of said random sets of values; and generating a random sample within each of said intervals of each of said dimensions.

13. The method of claim 1, wherein the step of establishing the local search neighborhood comprises:

generating an initial sample;

identifying the initial candidate point; and setting the initial candidate point as a center of a neighborhood of a predefined size.

14. The method of claim 13, wherein the initial sample is generated using a weighted Latin Hypercube Sampling method.

15. The method of claim 13, further comprising the steps of:

modifying the local search neighborhood so that the second candidate point is at the center of the local search neighborhood, if the second possible set of values will yield better computing system performance than the first possible set of values;

generating a subsequent sample; and updating information regarding the performance of the computing system, based on the subsequent sample.

* * * * *